United States Patent
Newbrough et al.

(10) Patent No.: US 7,597,264 B2
(45) Date of Patent: Oct. 6, 2009

(54) PRESENTATION INSTRUMENT WITH NON-FINANCIAL FUNCTIONALITY

(75) Inventors: Keith A. Newbrough, Parker, CO (US); Peter C. Robbins, Denver, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/551,063

(22) Filed: Oct. 19, 2006

(65) Prior Publication Data
US 2008/0116283 A1 May 22, 2008

(51) Int. Cl.
*G06K 19/00* (2006.01)

(52) U.S. Cl. .............. 235/487; 235/375; 235/380; 235/486; 235/451; 235/492

(58) Field of Classification Search .......... 235/380, 235/487, 375, 451, 486, 492
See application file for complete search history.

(56) References Cited

U.S. PATENT DOCUMENTS

| | | | |
|---|---|---|---|
| 6,121,544 A * | 9/2000 | Petsinger | 174/353 |
| 6,257,469 B1 * | 7/2001 | Cohn | 224/162 |
| 7,083,083 B2 * | 8/2006 | Droz | 235/375 |
| 7,106,201 B2 * | 9/2006 | Tuttle | 340/572.7 |
| 2003/0069846 A1 * | 4/2003 | Marcon | 705/41 |
| 2004/0126284 A1 * | 7/2004 | Lilly et al. | 422/119 |
| 2004/0144846 A1 * | 7/2004 | Lasch et al. | 235/487 |
| 2004/0169087 A1 * | 9/2004 | Lasch et al. | 235/493 |
| 2005/0211760 A1 * | 9/2005 | Dewan et al. | 235/375 |
| 2005/0247798 A1 * | 11/2005 | Graves et al. | 235/493 |
| 2006/0145893 A1 * | 7/2006 | Hassett | 340/928 |
| 2007/0040030 A1 * | 2/2007 | Kranzley et al. | 235/451 |
| 2007/0084913 A1 * | 4/2007 | Weston | 235/380 |

* cited by examiner

*Primary Examiner*—Thien M. Le
*Assistant Examiner*—Tuyen K Vo
(74) *Attorney, Agent, or Firm*—Townsend and Townsend and Crew LLP

(57) ABSTRACT

Systems and methods provide multi-use electronic payment arrangements to consumers for executing electronic payment transactions. Embodiments of these payment arrangements may offer added convenience and security for consumers and merchants by integrating payment devices with more useful presentation instruments.

24 Claims, 9 Drawing Sheets

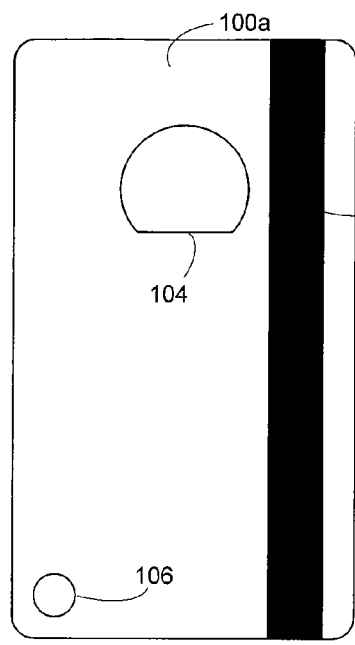
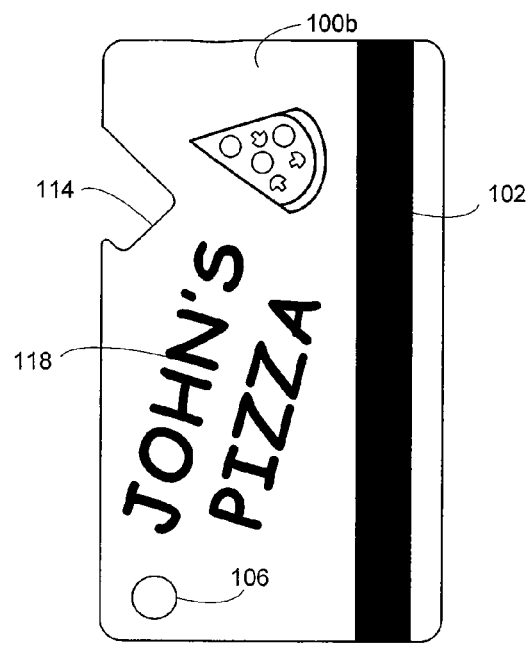
Fig. 1A        Fig. 1B
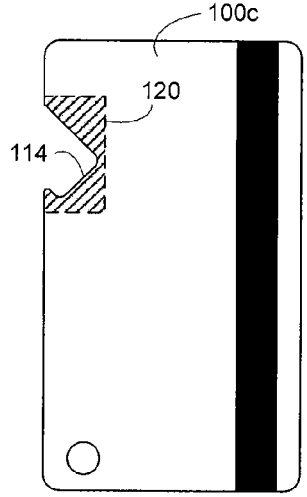
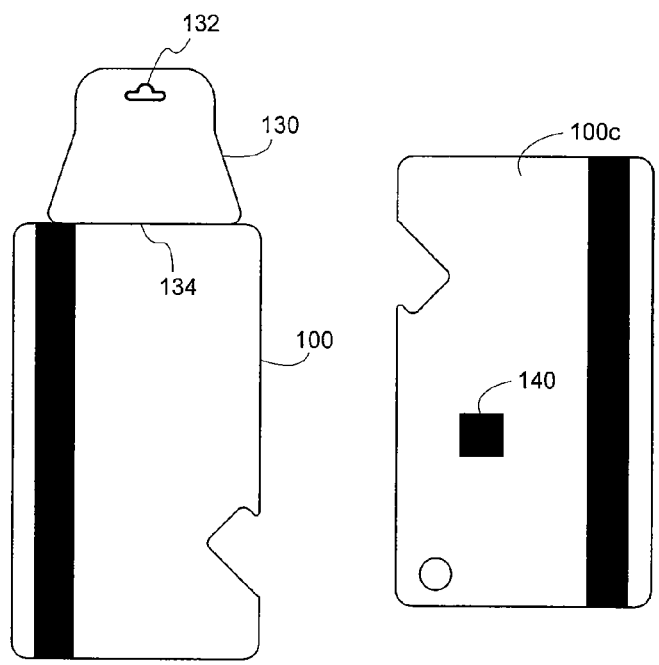
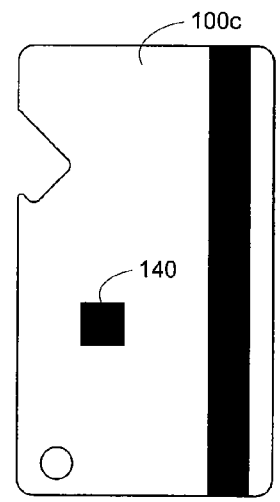
Fig. 1C        Fig. 1D        Fig. 1E

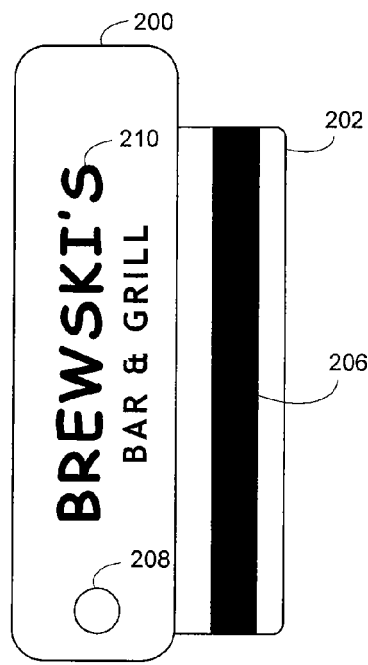
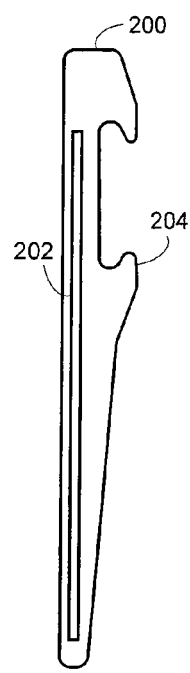
Fig. 2A  Fig. 2B
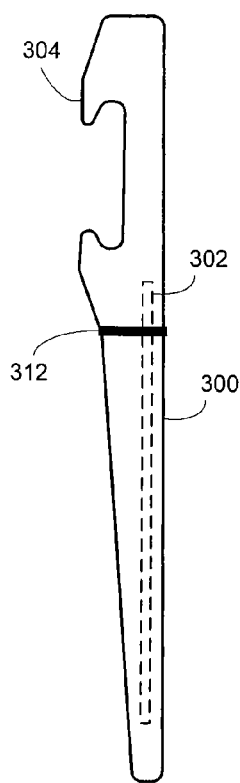
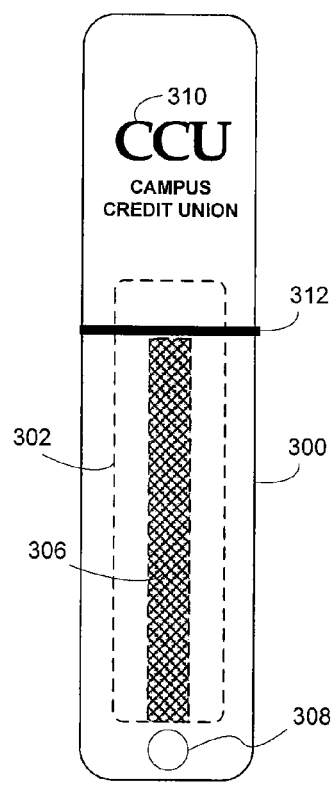
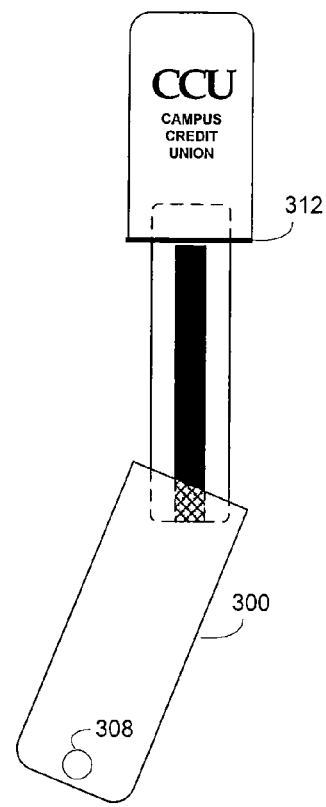
Fig. 3A  Fig. 3B  Fig. 3C

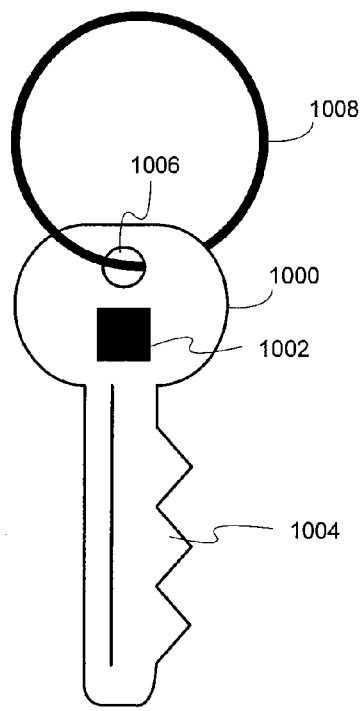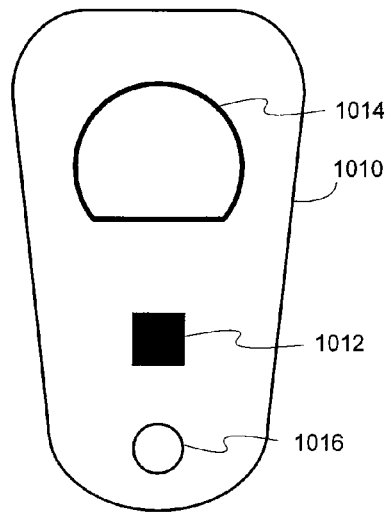
Fig. 10A       Fig. 10B
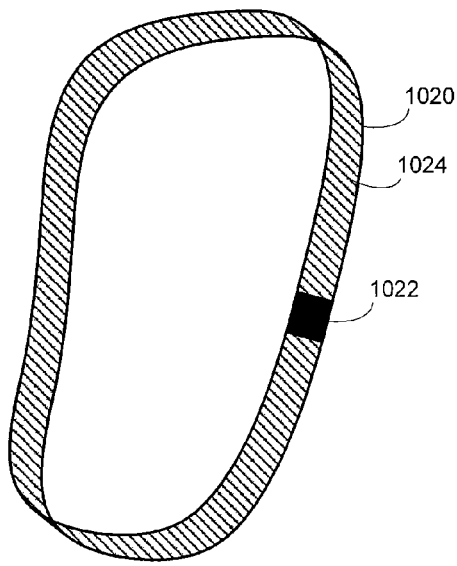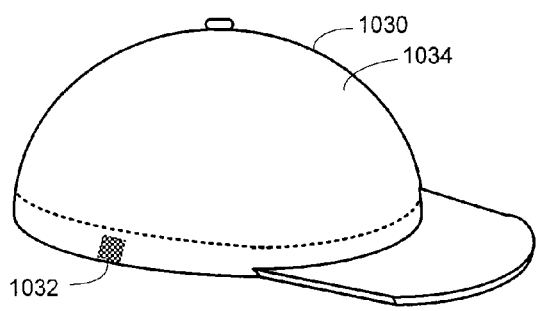
Fig. 10C       Fig. 10D

PRESENTATION INSTRUMENT WITH NON-FINANCIAL FUNCTIONALITY

CROSS-REFERENCES TO RELATED APPLICATIONS

This application is related to U.S. patent application Ser. No. 11/539,858, entitled "Electronic Payment Instrument and Packaging," which is incorporated herein by reference for all purposes.

BACKGROUND OF THE INVENTION

This application relates generally to systems and methods for electronic payment devices. More specifically, this application relates to systems and methods for providing a multi-use device to consumers for executing electronic payment transactions.

Over the past decades, new technology has caused a significant shift in point of sale (POS) transactions away from cash and checks and towards electronic payment devices. Consumers have found added convenience with devices like credit cards, debit cards, and stored-value cards.

Credit and debit cards typically comprise a standard-sized plastic card with a magnetic stripe, or magstripe. These magstripes store a large amount of information, including account number, country code, account holder name, expiration date, and other discretionary and proprietary data. Most POS's which accept credit and debit cards have magstripe readers, which read the information from the magstripe. The reader then communicates the information to the appropriate financial institution to verify and complete the transaction.

More recently, financial institutions began offering "stored value" cards, or "electronic purse applications." With these cards, a cash equivalency is stored on the card, rather than the card being linked to an account. Value may be added to the card either by transferring cash or by transferring money from a financial institution, at a kiosk, automated teller machine (ATM), by phone, or by some other means. Because the cards carry only a specific cash equivalence, cardholders may better limit their susceptibility to large unauthorized transactions. Further, because the cards are not associated with financial accounts, merchants may incur lower processing fees for handling transactions with stored value cards.

Stored value, gift, or other pre-paid metered payment devices in various forms have become increasingly popular for the purchase of goods and services and even telephone services. The sale of these cards as promotional goods has similarly increased in recent years. This growth has resulted in a multi-billion dollar electronic payment device industry.

Still, current electronic payment devices tend to have at least two inherent issues. The first issue involves convenience. Electronic payment devices are typically delivered to consumers in the form of a separate electronic payment instrument (e.g. a card sized for a wallet or keychain). As a result, consumers must constantly carry the device around for use in electronic payment transactions.

The second issue results from the fact that electronic payment devices are often susceptible to physical, electromagnetic, or other types of exposure. One result is that magnetic exposure and scratching can destroy the information stored on a magnetic stripe, and electromagnetic exposure can destroy the information stored on a radio-frequency transceiver. Another related result is that exposed magnetic stripes and transceivers can expose the information stored on them, allowing unauthorized appropriation of that often-private information.

Thus, it may be desirable to offer consumers electronic payment devices which are convenient to carry and easy to use for payment, while being better protected from harmful exposure.

BRIEF SUMMARY OF THE INVENTION

Embodiments of the invention can address this condition in the art by providing electronic payment devices to consumers in arrangements which allow for convenient carrying and use of the device, with lower susceptibility to harmful exposure.

A first set of embodiments provides a multi-use electronic payment arrangement. The payment arrangement comprises a presentation instrument, a payment device, and a mechanical device. The presentation instrument may be made at least in part of a first material. The payment device is integrated with the presentation instrument and configured for use with an electronic payment system. The mechanical device is integrated with the presentation instrument and configured to perform a mechanical function.

In certain of these embodiments, at least one of the payment device or the mechanical device is either rotably, slidably, or removably coupled with the presentation instrument. Further, in some embodiments, the mechanical device may comprise a second material different from the first material.

In other embodiments, the presentation instrument may shield the payment device from exposure. In certain of these embodiments, the exposure may comprise at least one of physical or electromagnetic exposure. Additionally or alternatively, the exposure may comprise exposure to an information appropriation system. In still other embodiments, the mechanical device may comprise a shield for shielding the payment device from exposure.

In still other embodiments, the payment device may comprise a magnetic material configured to provide transaction information to the electronic payment system. Further, in still other embodiments, the payment device may comprise a transceiver configured to provide transaction information to the electronic payment system.

A second set of embodiments provides a multi-use payment arrangement. The payment arrangement comprises a presentation means, a payment means, and a mechanical means. The payment means is integrated with the presentation means and configured for use with an electronic payment system. The mechanical means is integrated with the presentation means and configured to perform a mechanical function. In certain of these embodiments, at least one of the payment means or the mechanical means is integrated with the presentation means via an integration means.

A third set of embodiments provides a multi-use electronic payment arrangement. The payment arrangement comprises a presentation instrument, a payment device, and a container opener. The presentation instrument is made at least in part of a first material. The payment device is integrated with the presentation instrument and configured for use with an electronic payment system. The container opener is integrated with the presentation instrument.

In certain of these embodiments, the container opener may comprise a bottle opener. In others of these embodiments, the container opener may comprise a letter opener.

In some embodiments, the container opener may be removably coupled with the presentation instrument. Further, in some embodiments, the container opener may comprise a material different from the first material.

In other embodiments, the presentation instrument may shield the payment device from exposure. In still other embodiments, the payment device may comprise magnetic material and/or a transceiver configured to provide transaction information to the electronic payment system. Also, in other embodiments, the payment device may be a payment means.

A fourth set of embodiments provides a method for using a multi-use electronic payment arrangement. The method comprises providing the multi-use electronic payment arrangement, which comprises a presentation instrument, a payment device, and a mechanical device. The method further comprises using the payment device to execute a payment transaction with an electronic payment system, and using the mechanical device to perform a mechanical function. The presentation instrument is made at least in part of a first material, the payment device is integrated with the presentation instrument and configured for use with the electronic payment system, and the mechanical device is integrated with the presentation instrument and configured to perform the mechanical function.

This summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 1A-1E provide illustrations of multi-use electronic payment arrangements in various credit-card-like embodiments;

FIGS. 2A-2B provide exemplary illustrations of multi-use electronic payment arrangements configured for use as bottle openers;

FIGS. 3A-3C provide illustrations of an exemplary modification to the embodiments of FIGS. 2A and 2B wherein the arrangement is further configured to protect the payment device from exposure;

FIGS. 10A-10D provide exemplary illustrations of multi-use electronic payment arrangements comprising integrated transceiver-based payment devices.

DETAILED DESCRIPTION OF THE INVENTION

Figure 4A:
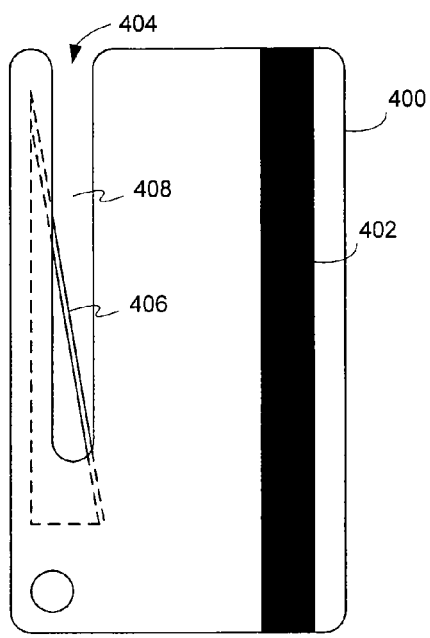
FIGS. 4A-4C provide illustrations of exemplary shapes and configurations for some embodiments of the invention.

Among other things, embodiments of the invention provide systems and methods involving multi-use electronic payment devices for allowing consumers to execute electronic payment transactions with added convenience and security.

FIGS. 1A-1E provide illustrations of various credit-card-like embodiments of the invention. In FIGS. 1A and 1B, a multi-use payment arrangement device is shown comprising presentation instruments 100*a* and 100*b*. A payment device and a mechanical device are integrated with the presentation instruments 100*a* and 100*b*.

In both Figures, the payment device 102 comprises a magnetic stripe which has been (or may be) loaded with transaction information. This transaction information may include any information useful for executing payment transactions, which may differ depending on the type of payment transaction associated with the payment device 102. For example, if the payment device 102 is intended for use with a credit account, the magnetic stripe may contain a credit account number, a cardholder name, a bank routing number, and other useful information for accessing and transacting with the credit issuing organization. On the other hand, if the payment device 102 is intended for use as a stored-value card, the magnetic stripe may contain information like the stored balance remaining on the card, and even various embedded security features.

It will be appreciated that many different payment devices may be used with the invention. Examples of payment devices include standard payment card devices, like credit cards, stored value cards, and debit cards; transceiver-based payment devices, like radio-frequency identification (RFID) chips; and check-based payment devices, like those based on magnetic ink character recognition (MICR).

It will be further appreciated that payment devices may also include various non-traditional interactions with payment systems. These non-traditional payment devices may include, among other things, biometric- and other code-based payment, like optical character recognition (OCR), fingerprint recognition, and retinal scanning may be used to effectuate payment transactions. For example, a payment device may store fingerprint data (either visually, electronically, or by some other means) which may correspond to the authorized user's fingerprint. To pay for a good or service using that payment device: first, the user may interface the payment device (e.g. scan) with a reader at a POS; second, the user may place her thumb on a fingerprint scanner; and third the payment system may compare the fingerprint data from the payment device and the scanner to authenticate the transaction. While this is not a traditional payment device, it will be understood that this and many other non-traditional devices are possible for effectuating electronic payment transactions.

The mechanical device illustrated in FIG. 1A comprises a cutout 104 shaped for use as a bottle opener. The cutout 104 is shaped like a circle with one flattened side. It will be appreciated, however, that many shapes will work for opening bottles or performing desired mechanical functions. For example, a circle flattened on two opposite sides may also be desirable. The various shapes, positions, and orientations of a cutout may affect both the efficacy of the mechanical device in performing its mechanical function and the cost of production of the mechanical device.

In FIG. 1B, for example, the mechanical device similarly comprises a cutout 114 shaped for use as a bottle opener. Here, however, the cutout 114 is shaped and positioned differently. This may provide various advantages. One advantage may be that moving the cutout 114 farther from the payment device 102 (i.e. magnetic stripe) may allow for higher yield in production of the cards (e.g. the cutout punching process is less likely to damage the magnetic stripe). Another advantage may be that use of the bottle opener cutout 114 in the configuration illustrated in FIG. 1B may place less stress on the material used to construct the presentation instrument. Again this may reduce the cost of production while also increasing the life of the multi-use payment arrangement.

It will be appreciated that the payment arrangement may be used for additional, non-mechanical functions. For example, FIG. 1B illustrates use of the payment arrangement for advertisement by integrating advertisement material 118 with the presentation instrument 100*b*.

Further, it will be appreciated that, different materials could be used to similar or even improved effect. For example, the presentation instrument 100*a* in FIG. 1A may experience a high bending force while its integrated mechanical device (the cutout bottle opener 104) is being used. To prevent fracturing of the presentation instrument 100*a*, stronger materials may be used. These materials include any natural and synthetic materials which may be effective for the desired purpose, including, but not limited to metal, plastic, wood, and composite.

For similar effect, stronger materials may be used to reinforce the mechanical device. For example, FIG. 1C illustrates a modification of the embodiments in 1B, wherein the mechanical device of presentation instrument 100*c* comprises both a cutout 114 and a reinforcing metal insert 120. While FIG. 1C illustrates an insert 120 shaped to fit the cutout 114, a metal insert may be sized or shaped differently for different effect. It will also be appreciated that differing materials may be used for reasons other than reinforcement. For example, materials may be chosen for properties including resistance to water damage, resistance to electrical conductivity, affinity for certain treatment processes, etc.

FIG. 1D illustrates another modification of the embodiments described by FIG. 1B, wherein the payment arrangement of presentation instrument 100*d* is attached to a display carrier 130. The display carrier 130 is configured to display the payment arrangement on a standard or custom point of sale display. The particular display carrier 130 illustrated in FIG. 1D comprises a hook cutout 132 shaped to fit a standard J-hook type of display rack. Of course, different display carriers may be desirable for use with different types of displays. For example, the display carrier 130 and/or hook cutout 132 may be shaped, sized, or positioned differently, or may comprise different materials. Additionally, multiple carriers and/or cutouts may be used. The display carrier(s) may be attached to the payment arrangement in different ways, including using mechanical or chemical fasteners. As illustrated, the display carrier 130 and presentation instrument 100*d* are manufactured from a single sheet of material and are separable at a perforated (or cut-apart) connection 134. Further, the presentation instrument 100*d* may be shaped or sized, or may comprise cutouts or other elements, to accommodate one or multiple types of standard or custom displays.

FIG. 1E illustrates yet another modification of the embodiments described by FIG. 1B, wherein the payment arrangement of presentation instrument 100*e* further comprises a second, transistor-based payment device 140. This transistor-based payment device 140 may comprise active, passive, or semi-passive (or semi-active) Radio-Frequency Identification (RFID) technology. Using, RFID technology, the transceiver-based payment device 140 could allow the payment arrangement more versatility. For example, the magnetic stripe 102 could be associated with a credit account while the transceiver-based payment device 140 (e.g. an RFID chip) could be associated with a stored value account; or the transceiver-based payment device 140 could store different types of transaction-related information, like extra security features.

The embodiments illustrated in FIGS. 1A-1E all manifest substantially the shape and size of a typical credit card. Using such standard specifications provides certain benefits. For example, the payment arrangement may more easily fit in a wallet or credit card holder, and may be more familiar to both consumers and merchants. Additionally, standard sizes may fit standard readers and displays more easily. However, many shapes, sizes, materials and other properties may be adapted for various desired uses. Some of the many possible variations in shapes and sizes are disclosed in U.S. patent application Ser. No. 10/665,984, which is incorporated herein by reference.

FIGS. 2A and 2B provide an exemplary illustration of this idea, with FIG. 2B showing a view of FIG. 2A from the right side. In FIGS. 2A and 2B, a multi-use payment arrangement comprises a presentation instrument 200, with an integrated payment device 202 and mechanical device 204. As in FIGS. 1A-1E, the payment device 202 comprises a magnetic stripe 206, and the mechanical device 204 is configured for use as a bottle opener. The presentation instrument 200 also comprises a hole 208 sized to fit a standard key ring. It will be appreciated that the payment device 202 and mechanical device 204 may be made of the same or different materials from each other and from the presentation instrument 200. For example, the entire payment arrangement, including the payment device 202, may be fashioned from one stamped piece of metal or one molded piece of plastic. Alternatively, the payment device 202 may be manufactured separately and later attached to the presentation instrument 200 using chemical or mechanical fasteners, including screws, rivets, glue, friction, etc.

The embodiments in FIGS. 2A and 2B may provide certain advantages over the embodiments in FIGS. 1A-1E. For example, the bottle opener 204 may be easier to use due to a more comfortable grip, improved torque, and better distribution of forces. Also, the shape and size may better fit on a keychain in a consumer's pocket, which may be more desirable than carrying a credit card-shaped arrangement. Of course, it may be desirable to size and position the magnetic stripe 206 to be used with a standard magstripe reader.

FIGS. 3A-3C provide a modification of the embodiments of FIGS. 2A and 2B. In FIGS. 3A-3C, the payment device 302 is integrated with the mechanical device 304, and fits inside the presentation instrument 300. FIG. 3A provides a view of the embodiments of FIG. 3B from the left side, and FIG. 3C provides a view of the embodiments of FIG. 3B with the presentation instrument 300 partially removed (and the payment device 302 partially exposed).

The payment arrangement of FIGS. 3A-3C further comprises optional elements of a hole 308 to fit a standard key ring, advertisement material 310 for promotion, and a seal 312. The seal 312 may be used for such purposes as providing added protection for the payment device 302 (e.g. a watertight seal), or a better fit between the presentation instrument 300 and the rest of the payment arrangement. The seal 312 may be made of rubber, plastic, composite, or any of a number of different materials for added efficacy, lower cost, or some other result.

While many obvious modifications of these embodiments are possible, certain features of the presentation instrument 300 as illustrated provide beneficial results. First, the presentation instrument 300 acts both as a protective housing for the payment device 302 and as a handle for the mechanical device 304. Because the payment device 302 comprises a volatile magnetic stripe 306, protection may be desirable. As a protective housing, the presentation instrument 300 may shield the payment device 302 from various types of exposure. Many types of exposure may be harmful to the magnetic stripe 306. For example, a strong magnetic field, scratching, and other exposure may alter or erase the data stored on the magnetic stripe 306. Further, exposure to certain devices may allow the data on the magnetic stripe 306 to be acquired by unauthorized parties. For instance, an identity thief may sense (or "sniff") data from the magnetic stripe 306.

Similar concerns may arise with transceiver-based payment devices. Strong electromagnetic fields may alter or erase data stored on these devices. Also, because these devices are intended to communicate some or all of their stored data under certain conditions, devices may exist to simulate those conditions, inducing the devices to transmit private data to unauthorized parties.

Another benefit of the presentation instrument 300 as illustrated is that the presentation instrument 300 may be attached to a key ring using the hole 308. The payment device 302 and mechanical device 304 may then be removed from the presentation instrument 300 without removing the presentation instrument 300 from the key ring. This allows for more convenient use of either or both of the payment device 302 and mechanical device 304 without interference or weight from the key ring (or other accoutrements attached to the key ring).

Figure 4B:
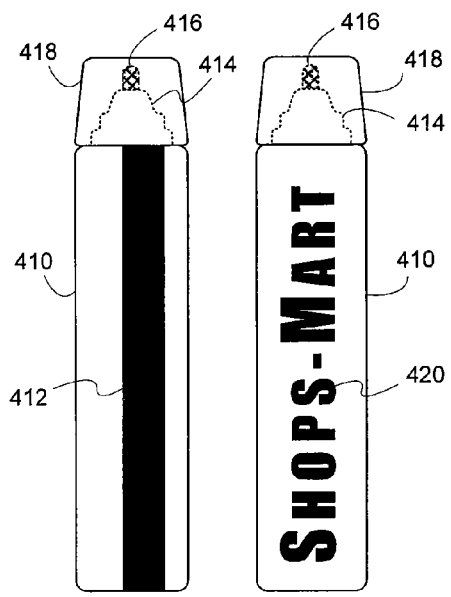
Figure 4C:
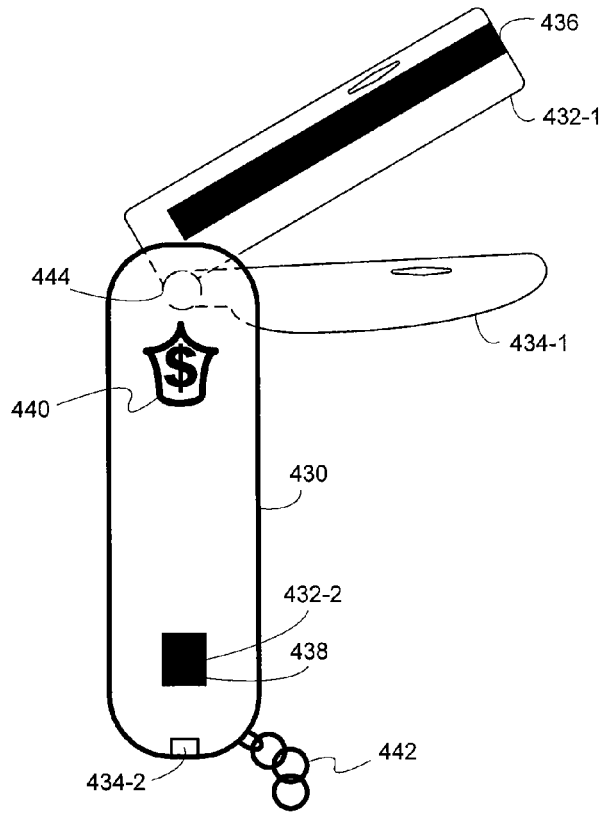

To this point the embodiments discussed herein have focused on mechanical devices configured for use as bottle openers. FIGS. 4A-4C provide some examples of other embodiments of the invention which still use magnetic stripes as an integrated payment device.

FIG. 4A provides an illustration of a multi-use payment arrangement, comprising a credit card-shaped presentation instrument 400, a magnetic stripe-based payment device 402, and a mechanical device 404 configured for use as a letter opener. The mechanical device 404 comprises a slot-shaped cutout 408 and a blade 406. For added efficacy, the blade 406 may be made of another material, such as metal.

FIG. 4B provides an illustration of a multi-use payment arrangement, comprising a rectangular presentation instrument 410, a magnetic stripe-based payment device 412, and a mechanical device 414 configured for use as a writing device. The mechanical device 414 comprises a writing tip 416 (e.g. a ball-point pen tip, exposed lead, etc.). Depending on the type of writing instrument employed, extra ink or lead (not shown) may be stored within the presentation instrument 410. As illustrated, the arrangement also comprises a cap 418 for the writing instrument. The cap may attach to the arrangement by friction or some other attachment. Also as illustrated, the arrangement comprises advertisement material 420.

FIG. 4C provides an illustration of a multi-use payment arrangement, comprising a multi-function tool-like presentation instrument 430, two payment devices 432-1 and 432-2, and mechanical devices 434-1 and 434-2 configured for multiple uses. The arrangement may comprise other features, including advertisement material 440 and a key ring attachment 442. Payment device 432-1 comprises a magnetic stripe 436, while payment device 432-2 comprises an RFID chip 438. One mechanical device 434-1 comprises a knife blade, while another mechanical device 434-2 comprises tweezers.

The first payment device 432-1 and mechanical device 434-1 are rotably coupled to the presentation instrument 430, so that they may be exposed or housed by swiveling them in or out of the presentation instrument 430 around an axis 444. The other payment device 432-2 may be permanently coupled to the presentation instrument 430 in any of a number of ways, including affixing the chip 438 to the presentation instrument 430. The other mechanical device 434-2 removably coupled to the presentation instrument 430 by inserting it into a custom-fit slot.

Figure 5A:
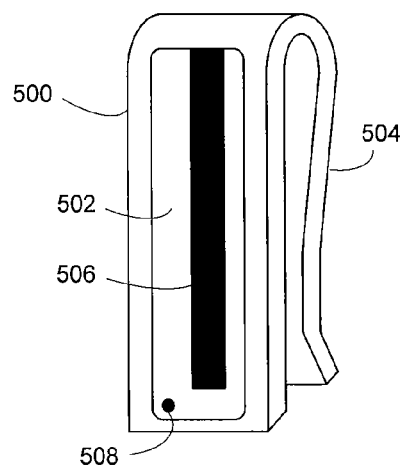
FIGS. 5A-5B provide exemplary illustrations of multi-use electronic payment arrangements configured for use as money clips.
Figure 5B:
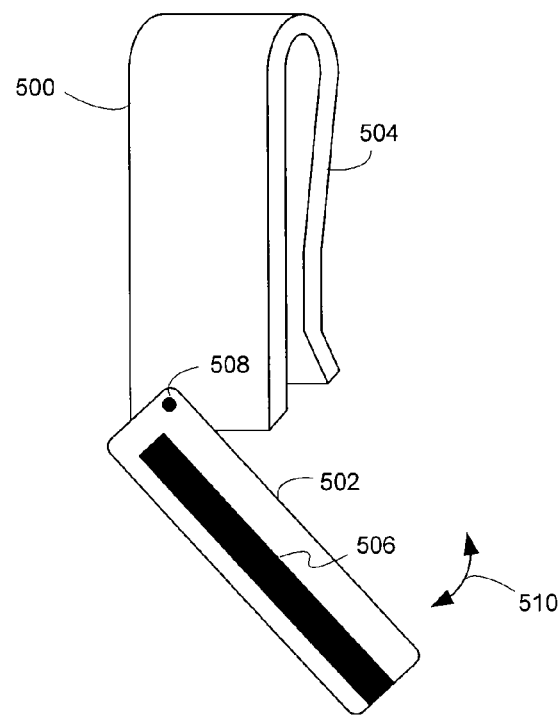

Embodiments illustrating different types of coupling are further explored in FIGS. 5A&B-7. FIGS. 5A&B provides a payment arrangement comprising a presentation instrument 500 with an integrated mechanical device 504 configured for use as a money clip. The arrangement further comprises a payment device 502 with a maguetic stripe 506, the payment device 502 being rotably coupled to the presentation instrument 500. The payment device 502 may be used by rotating it away from the presentation instrument 500 around its connection axis 508. The rotation direction is illustrated by arrow 510.

Figure 6A:
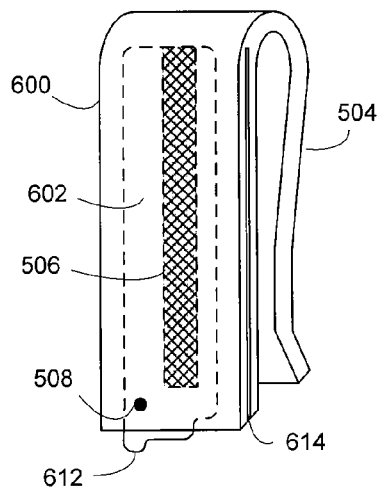
FIGS. 6A-6B provide illustrations of an exemplary modification to the embodiments of FIGS. 5A and 5B wherein the arrangement is further configured to protect the payment device from exposure.
Figure 6B:
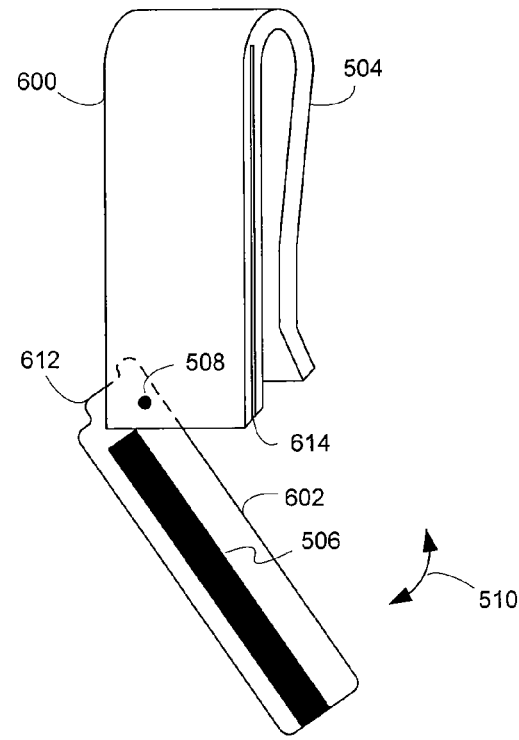

FIGS. 6A&B provides a similar arrangement to the embodiments of FIGS. 5A&B. However, the embodiments of FIGS. 6A&B provide the added feature that the presentation instrument 600 also acts as to shield the payment device 502 from exposure while in the closed position. This shielding may require additional features to be added to the arrangement. For example, the payment device 602 comprises a thumb contour 612 to aid in rotating the shielded payment device 602; and the presentation instrument 600 comprises a slot 614 to allow the payment device 602 to enter and exit the presentation instrument 600.

Figure 7A:
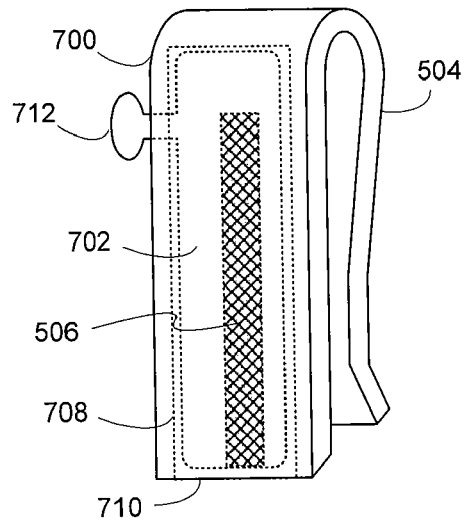
FIGS. 7A-7B provide illustrations of another exemplary modification to the embodiments of FIGS. 5A and 5B wherein the payment device is slidably coupled to the presentation instrument and protected from exposure.
Figure 7B:
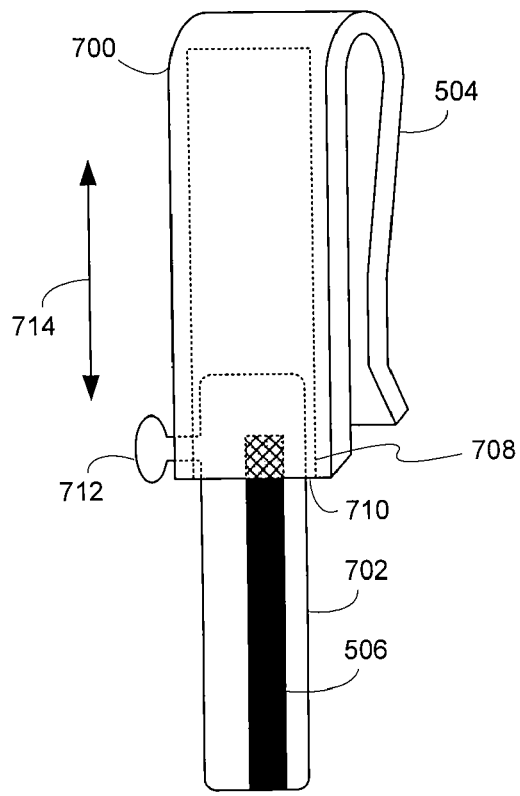

FIGS. 7A&B provides a similar arrangement to the embodiments of FIGS. 6A&B. However, in the embodiments of FIGS. 7A&B, the payment device 702 is slidably coupled with the presentation instrument 700. The payment device 702 further comprises a thumb slider 712 to aid in sliding the shielded payment device 702; and the presentation instrument 700 comprises a channel 708 which is open on one end 710 to allow the payment device 702 to enter and exit the presentation instrument 700. The sliding direction is illustrated by the arrow 714.

It will be appreciated that many other embodiments of the invention are possible with many different types of presentation instruments, payment devices, and mechanical devices. Some of these other embodiments of the invention are illustrated in FIGS. 8-10.

Figures 1, 8A:
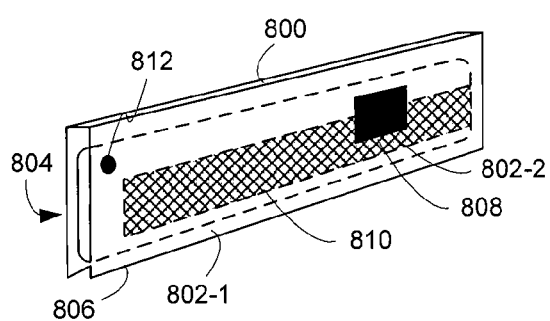
FIGS. 8A-1, 8A-2 and 8B provide exemplary illustrations of multi-use electronic payment arrangements configured to shield the payment device from exposure.
Figures 2, 8A:
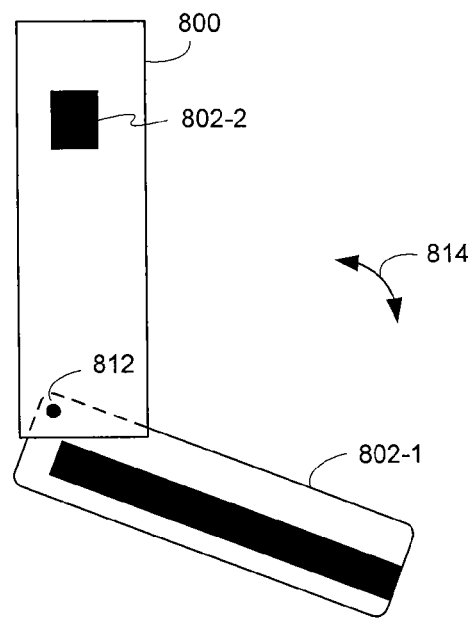

FIGS. 8A-1 and 8A-2 illustrate a payment arrangement comprising a presentation instrument 800 with two integrated payment devices 802-1 and 802-2. A mechanical device 804 is integrated into the presentation instrument 800 and is configured for use as a magnetic stripe shield. The first payment device 802-1 comprises a magnetic stripe 810 and is rotably coupled to the presentation instrument 800 via a connection axis 812. In its closed position, the magnetic stripe 810 sits within a channel 806 of the mechanical device 804, thereby shielding the magnetic stripe 810 from exposure. The second payment device 802-2 comprising an RFID chip 808 is permanently coupled to the presentation instrument 800. The first payment device 802-1 may be exposed for use by rotating it around its connection axis 812 along the arrow 814.

Figure 8B:
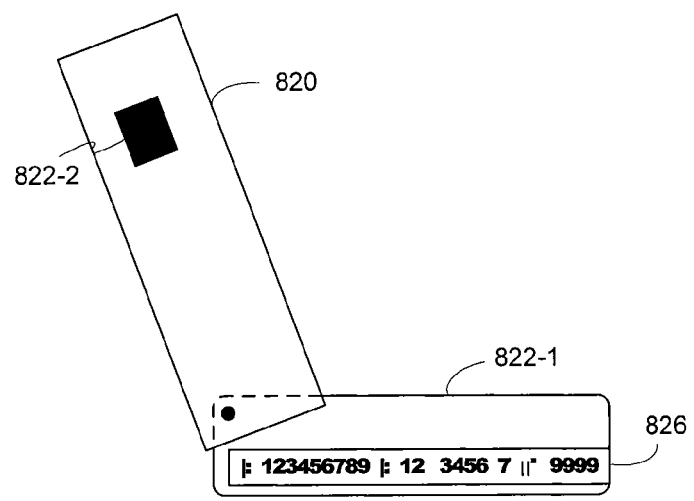

FIG. 8B illustrates a modification to presentation instrument 800 and comprises a payment device 822-1 having magnetic characters 826, rather than a magnetic stripe. Magnetic characters are often used with certain negotiable instruments, like checks, to identify certain account information. Because checks are processed differently from credit and debit cards, it may be desirable to use magnetic characters to execute certain transactions. Further, check-like transactions may be more efficient in some cases for single-use devices. If, for example, a merchant wanted to give a promotional keychain good for one free dinner at a restaurant, a one-time use device may be more desirable. It will be appreciated that many other types of payment device are possible. For example, non-magnetic characters may be used (e.g. they may be read into a check-processing system through an optical character recognition system), or transactions may require certain types of biometric or other data for processing and security. Payment instrument 800 also includes an RF chip 822-2.

Figure 9:
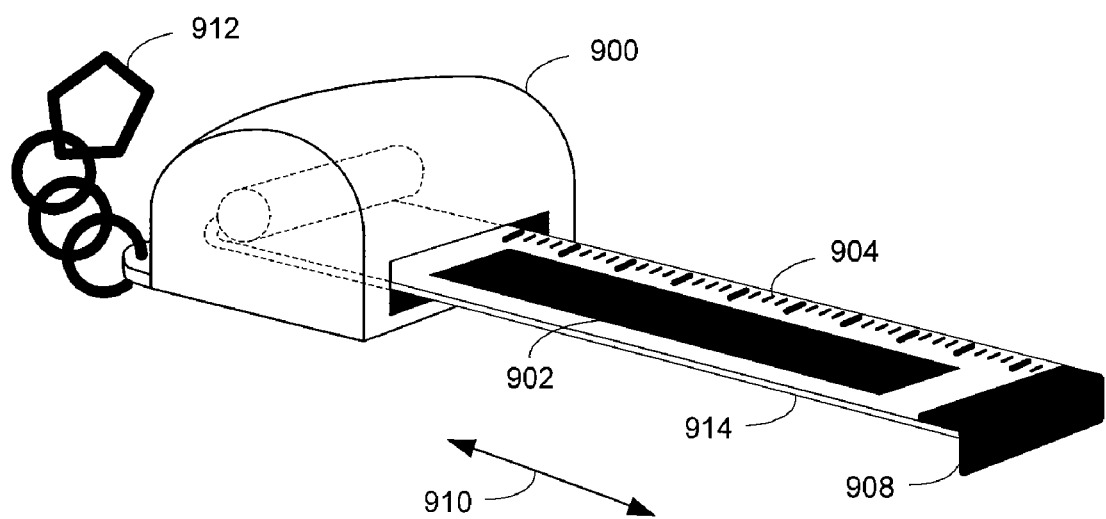
FIG. 9 provides an exemplary illustration of a multi-use electronic payment arrangement configured for use as a tape measure.

FIG. 9 illustrates yet another possible embodiment of the invention, wherein the presentation instrument 900 houses a retractable roll of flexible material 914. The magnetic stripe-based payment device 902 and mechanical device 904 are integrated with the presentation instrument 900 by being integrated with the flexible material 914. The mechanical device 904 comprises markings configured for use as a tape measure. The flexible material 914 also comprises a handle 908 for extending the flexible material 914 from the presentation instrument 900 along the arrow 910. The presentation instrument 900 also comprises a key ring (or belt loop) attachment 912.

FIGS. 10A-D illustrate some other possible embodiment of the invention, focusing on the use of transceiver-based payment devices in various multi-use payment arrangements. FIG. 10A provides a key-shaped presentation instrument 1000 comprising a transceiver-based payment device 1002 and a mechanical device 1004 configured for use in interfacing with a certain lock configuration. The presentation instrument 1000 further comprises a hole 1006 sized and positioned to interface with a standard key ring 1008.

FIG. 10B provides a bottle-opener-shaped presentation instrument 1010 comprising a transceiver-based payment device 1012 and a mechanical device 1014 configured for interfacing with and opening standard bottle tops. The presentation instrument 1010 further comprises a hole 1016 sized and positioned to interface with a standard key ring (not shown).

It will be appreciated that many arrangements are possible which may provide a user with a convenient way of carrying the payment device and/or mechanical device. For example, the arrangement may secure the payment or mechanical device to the user's person, clothing, or accessories (e.g. belts, shoes, purses, sunglasses, MP3 players, cosmetics, etc.). The arrangement may provide an interface to these or other items (e.g. through the presentation instrument or mechanical device), or may be integrated with the item.

For example, FIG. 10C provides a wristband-shaped presentation instrument 1020 comprising a transceiver-based payment device 1022 and a mechanical device 1024 configured for securing the payment device to a user's wrist. In a further example, FIG. 10D provides a baseball cap-shaped presentation instrument 1030 comprising a transceiver-based payment device 1032 sewed into the lining of the cap and a mechanical device 1034 configured for securing the payment device to a user's head. Some methods and systems for integrating certain payment devices with various types of carriers are disclosed in U.S. patent application Ser. No. 11/539,858, which is incorporated herein by reference.

Figure 11:
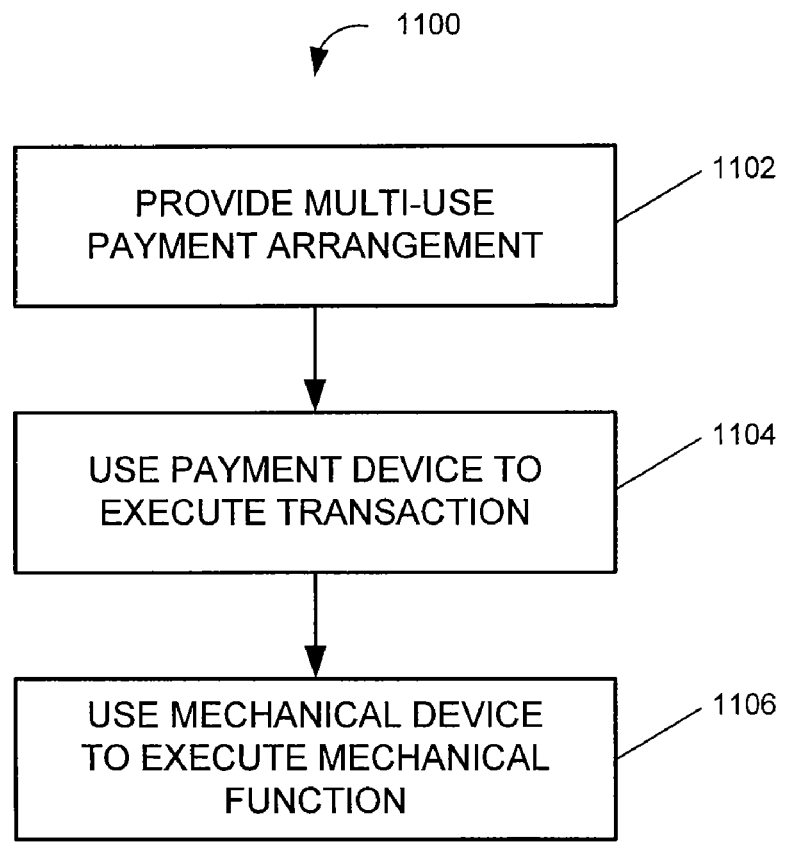
FIG. 11 provides a flow diagram summarizing methods of using multi-use electronic payment arrangement in its various embodiments.

FIG. 11 provides a flow diagram of methods for using embodiments of the invention. The method 1100 comprises providing 1102 a multi-use payment arrangement comprising a payment device and a mechanical device. The method 1100 further comprises using the payment device 1104 to execute a payment transaction, and using the mechanical device 1106 to execute a mechanical function.

Providing 1102 a multi-use payment arrangement may comprise providing the arrangement for free or for a fee. For example, the arrangement may be provided as a promotional good for free at any number of locations, including but not limited to supermarkets, restaurants, and other types of stores. Alternatively, the arrangement may be provided for a fee at various types of points of sale by retailers, wholesalers, or middlemen. Further, the arrangement may be provided to many types of parties, including consumers, merchants, or wholesalers.

Using the payment device 1104 may comprise execution of any of many types of payment transactions. In one example, the device may be used to pay for goods or services from a credit, debit, or stored-value type of account. In another example, the device may be used to execute various types of account functions, including balance transfers, balance inquiries, deposits, etc. Further, the payment device may merely facilitate one or more elements of a payment transaction. For example, the transaction may actually occur on a financial server at a credit issuing organization, with the payment device merely providing the necessary security authorization to allow the transaction to proceed.

Using the mechanical device 1106 may comprise execution of any of many types of mechanical functions. Many of these mechanical functions are illustrated in FIGS. 1-10. These mechanical functions may include use as container openers (e.g. bottles, cans, letters, etc.), keys, knives, clothing, accessories, or securing devices for securing the payment device or devices to a carrier or user.

It will be appreciated that components of the systems described herein can be rearranged or connected differently to perform similar or identical functions; and steps of the methods described herein may be performed in alternate orders and still provide similar or identical results. Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A multi-use electronic payment arrangement comprising:
   a presentation instrument made at least in part of a first material;
   a payment device integrated with the presentation instrument and comprising a transceiver configured for use with an electronic payment system, such that the transceiver is adapted to communicatively couple the payment device with the electronic payment system;
   a mechanical device integrated with the presentation instrument and configured to perform a mechanical function; and
   a shield operable to shield the transceiver from electromagnetic exposure to an information appropriation system and to house the mechanical device when the shield is engaged, wherein the shield is interfaced with the payment device such that the payment device can be communicatively coupled with the electronic payment system only when the shield is disengaged, and the shield is configured to be engaged for the mechanical device independent of the shield being engaged for the payment device.

2. The arrangement recited in claim 1, wherein at least one of the payment device or the mechanical device is rotably coupled with the presentation instrument.

3. The arrangement recited in claim 1, wherein at least one of the payment device or the mechanical device is slidably coupled with the presentation instrument.

4. The arrangement recited in claim 1, wherein at least one of the payment device or the mechanical device is removably coupled to the presentation instrument.

5. The arrangement recited in claim 1, wherein the mechanical device comprises a second material different from the first material.

6. The arrangement recited in claim 1, wherein the shield farther shields the payment device from physical exposure.

7. The arrangement recited in claim 1, wherein the payment device comprises a magnetic material configured to provide transaction information to the electronic payment system.

8. The arrangement recited in claim 1, wherein the shield is integrated with the presentation instrument.

9. The arrangement recited in claim 1, wherein the shield is integrated with the mechanical device.

10. The arrangement recited in claim 1, further comprising a second payment device wherein the second payment device is integrated into the shield.

11. The arrangement recited in claim 1, wherein the mechanical device comprises at least one of a letter opener, a writing tip, a multi-function tool, a money clip, a tape measure, a key, a clothing item, or a clothing accessory.

12. A multi-use electronic payment arrangement comprising:
 a presentation means;
 a first payment means integrated with the presentation means and comprising a transceiving means for communicating transaction information with a first electronic payment system;
 a second payment means integrated with the presentation means for communicating transaction information with a second electronic payment system;
 a mechanical means integrated with the presentation means and configured to perform a mechanical function; and
 a shielding means for shielding the first transceiving means from electromagnetic exposure to an information appropriation system when the shielding means is engaged.

13. The arrangement recited in claim 12, wherein at least one of the payment means or the mechanical means is integrated with the presentation means via an integration means.

14. The arrangement recited in claim 12, wherein the second payment means is susceptible to electromagnetic exposure when the when the shielding means is engaged.

15. A multi-use electronic payment arrangement comprising:
 a presentation instrument made at least in part of a first material;
 a first payment device integrated with the presentation instrument and comprising a transceiver configured for use with an electronic payment system;
 a second payment device configured for use with an electronic payment system;
 a container opener integrated with the presentation instrument; and
 a shield operable to shield the second payment device from electromagnetic exposure to an information appropriation system when the shield is engaged, wherein the transceiver is integrated with the presentation instrument external to the shield.

16. The arrangement recited in claim 15, wherein the container opener comprises a bottle opener.

17. The arrangement recited in claim 15, wherein the container opener comprises a letter opener.

18. The arrangement recited in claim 15, wherein the container opener is removably coupled with the presentation instrument.

19. The arrangement recited in claim 15, wherein the container opener comprises a material different from the first material.

20. The arrangement recited in claim 15, wherein the shield further shields the payment device from physical exposure.

21. The arrangement recited in claim 15, wherein the payment device comprises magnetic material configured to provide transaction information to the electronic payment system.

22. The arrangement recited in claim 15, wherein the payment device is a payment means.

23. The arrangement recited in claim 15, wherein the shield is integrated with the mechanical device.

24. A method for using a multi-use electronic payment arrangement, the method comprising:
 providing the multi-use electronic payment arrangement comprising
  a presentation instrument made at least in part of a first material,
  a payment device integrated with the presentation instrument and comprising a first transceiver configured for use with a first electronic payment system,
  a second transceiver configured for use with a second electronic payment system,
  a mechanical device integrated with the presentation instrument and configured to perform a mechanical function; and
  a shield operable to shield the first transceiver from electromagnetic exposure to an information appropriation system when the shield is engaged, and is operable to shield the mechanical device regardless of whether the shield is engaged to shield the first transceiver; and
 receiving payment transaction information from the first transceiver when the shield is not engaged.

* * * * *

UNITED STATES PATENT AND TRADEMARK OFFICE
CERTIFICATE OF CORRECTION

PATENT NO. : 7,597,264 B2  Page 1 of 1
APPLICATION NO. : 11/551063
DATED : October 6, 2009
INVENTOR(S) : Newbrough et al.

It is certified that error appears in the above-identified patent and that said Letters Patent is hereby corrected as shown below:

Column 8, line 19, delete "maguetic", and insert --magnetic--; and

Claim 6, column 11, line 17, delete "farther", and insert --further--.

Signed and Sealed this

Seventeenth Day of November, 2009

David J. Kappos
*Director of the United States Patent and Trademark Office*